United States Patent Office 2,852,498
Patented Sept. 16, 1958

2,852,498
BIS-THIOAMIDE VULCANIZATION ACCELERATORS

Harris Walton Bradley and Peter Kovacic, Wilmington, Del., assignors to E. I. du Pont de Nemours & Company, Wilmington, Del., a corporation of Delaware No Drawing. Application May 18, 1954
Serial No. 430,718

6 Claims. (Cl. 260—79.5)

This invention relates to the vulcanization of natural and synthetic rubber and more particularly to the vulcanization of polychloroprene using new and effective low temperature vulcanization accelerators.

Polychloroprene is a generic name applied to the polymers of 2-chloro-1,3-butadiene (chloroprene), and to copolymers of the same with minor amounts of copolymerizable dienes or vinyl compounds such as acrylonitrile, butadiene, isoprene, dichlorobutadiene, and styrene. These polychloroprenes (which term is used to include copolymers) may be made in aqueous emulsions and are available today under such names as "neoprene type GN," "neoprene type W," "neoprene type FR," and as latices under type numbers such as type 571, type 735, and type 842, all of which are generally referred to as polychloroprenes or chloroprene polymers.

Although many compounds have been found to be very effective in accelerating the vulcanization of natural and synthetic rubber by means of sulfur and also for carrying out an analogous transformation of neoprene to the elastic, non-plastic state, further improvement is still desirable. Thus it is desirable to find new accelerators which are effective at lower vulcanization temperatures than are now practical but which, on the other hand, do not cause vulcanization at the temperatures at which the rubber stocks are mixed, stored, and handled before the vulcanization step. In the case of polychloroprene, an additional reason for avoiding a premature reaction between the accelerator and the elastomer is that such reactions often generate hydrochloric acid which coagulates the latex before it can be used.

This invention has as an object to provide a class of compounds useful as vulcanization accelerators. A further object is to provide vulcanization accelerators for polychloroprene which are effective at low vulcanization temperatures and which show little of the undesirable effects produced by most very active accelerators. A still further object is to provide vulcanization accelerators which are useful in the rapid curing at relatively low temperatures of articles made from polychloroprene latex. Other objects will appear hereinafter.

These objects are accomplished by the following invention of incorporating into a vulcanizable polychloroprene from 0.2 to 5.0% by weight of a bisthioamide selected from the group consisting of bisthioamides having the following formulae:

(a) N,N'-dibutyl-dithio-adipamide
(b) N,N'-dilauryl-dithio-adipamide
(c) 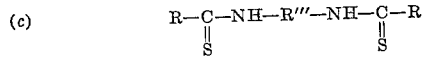
(d) 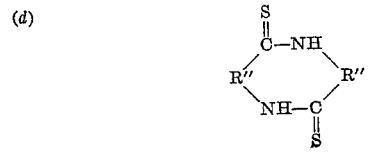

wherein R is a monovalent hydrocarbon radical of from 1 to 20 carbon atoms, R'' is a divalent hydrocarbon radical of from 1 to 20 carbon atoms with both valences on the same carbon atom and R''' is a divalent hydrocarbon of from 2 to 20 carbon atoms with the valences on different carbon atoms. The hydrocarbon radicals of R, R'' and R''' may be either saturated or unsaturated, aliphatic or aromatic and include the cycloalkyl and aralkyl radicals. These bisthioamides are very effective low temperature vulcanization accelerators for neoprene and are particularly useful in the rapid curing at relatively low temperature of articles made from neoprene latex.

The range of most effective concentration of bisthioamide to be incorporated into the vulcanizable neoprene is from about 0.2 to 5.0% by weight and preferably from 0.5 to 2.0%. Any vulcanization temperature may be used; however, the lower temperatures in the neighborhood of 100° to 120° C. are the most useful, since they permit good cures in short periods whereas the usual accelerators give incomplete cures at these temperatures unless the curing time is much extended.

The N,N'-disubstituted dithioamides used in the present invention may be made by the reaction of phosphorus pentasulfide with the corresponding diamide or, more conveniently by the reaction of the appropriate dinitrile, amine, and hydrogen sulfide as fully described in U. S. P. 2,201,170 and 2,280,578. Thus adiponitrile, butylamine, and hydrogen sulfide give N,N'-dibutyl dithioadipamide, as follows:

NC—(CH$_2$)$_4$—CN + 2C$_4$H$_9$NH$_2$ + 2H$_2$S ⟶

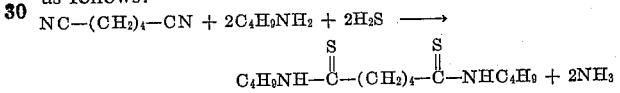

The alkylene bis(thioamide) is similarly made from the corresponding alkylene diamine, hydrogen sulfide and nitrile or from the corresponding diamide and phosphorus pentasulfide. The preferred synthesis of N,N'-ethylene bis(thiobenzamide) is therefore as follows:

H$_2$N—(CH$_2$)$_2$—NH$_2$ + 2C$_6$H$_5$CN + 2H$_2$S ⟶

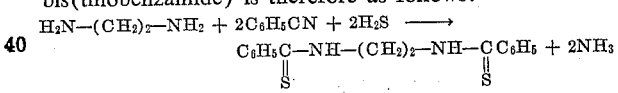

The piperazine dithiones are conveniently made from the diketopiperazines and phosphorous pentasulfide. Thus two molecules of leucine react to give 3,6-diisobutyl-2,5-diketopiperazine which gives the corresponding dithione, when heated with phosphorus pentasulfide.

The following examples will better illustrate the nature of the present invention; however, it is to be understood that the invention is not intended to be limited to these examples. The parts used are by weight unless otherwise specified.

In Examples 1 to 14, a latex, made by polymerizing chloroprene, containing 0.5% of sulfur, in an aqueous emulsion in which the emulsifying agent is the sodium salt of disproportionated rosin, was compounded as follows:

|   | Parts |
|---|---|
| Polychloroprene latex solids | 100 |
| 2,2'-methylene bis(6-tertiary butyl-p-cresol) | 1 |
| Zinc oxide | 5 |
| Sulfur | 2 |
| Accelerator (as in tables) | 2 |

Each of the compounding ingredients used was added to the latex as a dispersion in the conventional manner. The following formulation was used in providing an aqueous dispersion of each accelerator:

|   | Parts |
|---|---|
| Ingredient to be added | 8 |
| Casein, 10% solution | 5 |
| Sodium dinaphthylmethane sulfonate | 15 |
| Water | 22 |

For testing, films were prepared by the usual dipping procedure, dried for 2 hours, at 70° C., and further vulcanized as indicated in the tables. The cured films were then tested and their modulus at various elongations, their tensile strength, and elongation at break were determined, as shown in the tables.

For comparison, values obtained without accelerator (control) and with diphenyl thiourea, a recommended polychloroprene accelerator, and in some cases, epsilon-thiocaprolactam, another excellent accelerator, are included. In some cases, several values are given, to show the range ordinarily obtained. The improvement obtained by the use of the present invention is particularly noticeable in the modulus, indicating a more complete cure.

TABLE I

| Ex. No. | Accelerator Compound (2%) | Cure, Min./° C. | Modulus at 500% Elongation (p.s.i.) | Tensile Strength (p.s.i.) | Elongation At Break (percent) |
|---|---|---|---|---|---|
| 1 | N,N'-Di-n-propyl-dithioadipamide | 60/100 | 525 | 2,825 | 780 |
|   |   | 60/120 | 1,300 | 1,975 | 570 |
| 2 | N,N'-Di-n-butyl dithioadipamide | 60/100 | 550 | 2,850 | 830 |
|   |   | 60/120 | 1,125 | 2,150 | 570 |
| 3 | N,N'-Di-n-hexyl-dithioadipamide | 60/100 | 450 | 3,525 | 920 |
|   |   | 60/120 | 1,250 | 2,225 | 590 |
| 4 | N,N'-Di-cyclohexyl-dithioadipamide | 60/100 | 400 | 2,725 | 890 |
|   |   | 60/120 | 1,350 | 2,450 | 580 |
| 5 | N,N'-Diphenyl dithioadipamide | 60/100 | 350 | 2,600 | 920 |
|   |   | 60/120 | 725 | 2,600 | 660 |
| 6 | N,N'-Di-n-propyl-dithiohydromuconeamide | 60/100 | 650 | 2,575 | 690 |
|   |   | 60/120 | 1,325 | 2,425 | 580 |
| 7 | N,N'-Di-n-butyl-dithiohydromuconamide | 60/100 | 575 | 2,750 | 710 |
|   |   | 60/120 | 1,150 | 2,250 | 580 |
|   | N,N'-Ethylene bis(thiobenzamide) | 60/200 | 425 | 2,625 | 940 |
|   |   | 60/100 | 1,250 | 2,100 | 570 |
|   | N,N'-Diphenyl-thiourea | 60/100 | 250 | 2,800 | 960 |
|   |   | 60/120 | 550 | 2,925 | 720 |
| 8 | ----do---------- | 60/100 | 325 | 2,175 | 860 |
|   |   | 60/120 | 600 | 2,200 | 650 |
|   | Control (no accelerator) | 60/100 | 275 | 2,700 | 990 |
|   |   | 60/120 | 250 | 3,125 | 1,010 |
|   | ----do---------- | 60/100 | 325 | 2,550 | 980 |
|   |   | 60/120 | 325 | 2,600 | 950 |

TABLE II

| Ex. No. | Accelerator Compound (2%) | Cure, Min./° C. | Modulus at 600% Elongation (p.s.i.) | Tensile Strength (p.s.i.) | Elongation At Break (percent) |
|---|---|---|---|---|---|
| 9 | N,N'-Di-n-butyl dithioadipamide | 30/100 | 550 | 2,875 | 900 |
|   |   | 60/100 | 950 | 2,650 | 760 |
|   |   | 60/120 | ¹2,700 | 2,150 | 540 |
| 10 | N,N'-Dipentamethylene dithioadipamide | 30/100 | 550 | 2,300 | 910 |
|   |   | 60/100 | 650 | 2,775 | 890 |
|   |   | 60/120 | 2,100 | 2,575 | 620 |
|   | 3,6-Diisobutyl-2,5-piperazine dithione | 30/100 | 775 | 2,575 | 900 |
|   |   | 60/100 | 1,000 | 3,250 | 900 |
|   | Epsilon thiocaprolactam | 30/100 | 600 | 2,650 | 900 |
|   |   | 60/100 | 850 | 2,850 | 820 |
| 11 |   | 60/120 | 850 | 3,100 | 840 |
|   | Diphenylthiourea | 30/100 | 500 | 2,325 | 900 |
|   |   | 60/100 | 600 | 2,575 | 880 |
|   |   | 60/120 | 1,500 | 2,875 | 690 |
|   | Control (no accelerator) | 30/100 | 500 | 2,425 | 950 |
|   |   | 60/100 | 475 | 2,750 | 980 |
|   |   | 60/120 | 350 | 2,825 | 980 |

¹ Slightly extrapolated.

TABLE III

| Ex. No. | Accelerator Compound | Amount, percent | Cure, Min./° C. | Modulus at 600% Elongation (p.s.i.) | Tensile Strength (p.s.i.) | Elongation At Break (percent) |
|---|---|---|---|---|---|---|
| 12 | N,N'-Di-n-butyl dithioadipamide | 2 | 60/100 | 950 | 2,650 | 760 |
|   |   |   | 60/120 | 2,700 | 2,150 | 540 |
| 13 | ----do---------- | 1 | 60/100 | 850 | 2,900 | 800 |
|   |   |   | 60/120 | 2,000 | 2,500 | 650 |
| 14 | N,N'-Di-n-butyl dithioadipamide | 0.5 | 60/100 | 550 | 2,825 | 900 |
|   |   |   | 60/120 | 800 | 3,300 | 880 |
|   | Control (no accelerator) |   | 60/100 | 475 | 2,750 | 980 |
|   |   |   | 60/120 | 350 | 2,825 | 980 |

Additional bisthioamides within the scope of the present invention which have been tested and which have given cures similar to those of the above tables are:

(1) N,N'-dimethyl dithioadipamide
(2) N,N'-diallyl dithioadipamide
(3) N,N'-dibenzyl dithioadipamide
(4) N,N'-dilauryl dithioadipamide
(5) N,N'-dibutyl dithio-suberic amide
(6) N,N'-dimethyl octadecane dicarboxylic acid dithioamide
(7) N,N'-diethyl dithioterephthalic amide
(8) N,N'-distearyl dithioadipamide
(9) N,N'-ethylene bis(thiocaprylamide)
(10) N,N'-ethylene bis(thiooleamide)
(11) N,N'-eicosamethylene bis(thiobenzamide)
(12) 3,6-distearyl-2,5-piperazine dithione
(13) 3,6-diphenyl-2,5-piperazine dithione To illustrate the stability of latices containing the accelerators of the present invention, a latex compounded with 2% of N,N'-dibutyl dithioadipamide, as in Example 2, was stored for 20 days at room temperature. There was no coagulation and the final pH was 11.6. On the other hand, the same latex compounded with 2% of thiocaprolactam, as in one of the compositions used for comparison in Table II, was coagulated in this time, the final pH being 10.4. The thiocaprolactam is typical of other rapid accelerators in rapidly generating acid in the presence of neoprene even at room temperature. The compounds of the present invention do not do this even though their vulcanizing action at curing temperatures is believed to be due in part to reaction with the polychloroprene.

Although the bisthioamides of this invention find their greatest use in the curing of films, thin-walled articles, and other structures formed from polychloroprene latex, they are also useful when incorporated directly into solid types of neoprene.

*Example 15*

Using a plastic type of solid elastomer made by polymerizing chloroprene in emulsion in the presence of a long-chain mercaptan, the following stock was made up in the usual way on a rubber mill and was then cured for 40 min. at 153° C.

|   | Parts |
|---|---|
| Neoprene | 100 |
| Carbon black | 30 |
| Phenyl betanaphthylamine | 1 |
| Magnesium oxide | 4 |
| Zinc oxide | 5 |
| N,N'-dibutyl dithioadipamide | 1 |

An excellent cure was obtained.

In the vulcanization process of the present invention any type of the vulcanizable polychloroprene stock known to the art may be used. These usually contain a polyvalent metal oxide, particularly zinc oxide, magnesium oxide and litharge and most often a mixture of the first two. Sulfur is often used addition, but it should be pointed out that the compounds of the present invention are effective in both the presence and absence of sulfur, their accelerating effect not being limited to the type of vulcanization which is caused by sulfur.

It is apparent from the preceding description that the bisthioamides of the present invention are effective low temperature vulcanization accelerators in that they permit good cures in short cycles and at the same time show little of the undesirable effects produced by other very active accelerators.

As many apparently widely different embodiments of this invention may be made without departing from the spirit and scope thereof, it is to be understood that this invention is not limited to the specific embodiments thereof except as defined in the appended claims.

What is claimed is:

1. A vulcanizable polychloroprene composition having incorporated therein from 0.2 to 5.0% by weight of a bisthioamide selected from the group consisting of bisthioamides having the following formulae:

(a) N,N'-dibutyl-dithio-adipamide
(b) N,N'-dilauryl-dithio-adipamide
(c) $$R-\underset{\underset{S}{\|}}{C}-NH-R'''-NH-\underset{\underset{S}{\|}}{C}-R$$
(d) 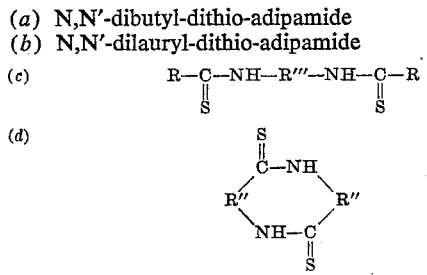

wherein R is a monovalent hydrocarbon radical of from 1 to 20 carbon atoms, R" is a divalent hydrocarbon radical of from 1 to 20 carbon atoms with both valences on the same carbon atom and R''' is a divalent hydrocarbon radical of from 2 to 20 carbon atoms with the valences on different carbon atoms.

2. A vulcanizable polychloroprene composition having incorporated therein from 0.2 to 2.0% by weight of N,N'-dibutyl-dithioadipamide.

3. A vulcanizable polychloroprene composition having incorporated therein from 0.5 to 2.0% by weight of N,N'-dilauryl-dithio-adipamide.

4. A vulcanizable polychloroprene composition having incorporated therein from 0.5 to 2.0% by weight of N,N'-ethylene bis(thiobenzamide).

5. A vulcanizable polychloroprene composition having incorporated therein from 0.5 to 2.0% by weight of 3,6-diisobutyl-2,5-piperazine dithione.

6. In the process of vulcanizing polychloroprene, the improvement of incorporating before vulcanization from 0.2 to 5.0% by weight of a bisthioamide selected from the group consisting of bisthioamides having the following formulae:

(a) N,N'-dibutyl-dithio-adipamide
(b) N,N'-dilauryl-dithio-adipamide
(c) $$R-\underset{\underset{S}{\|}}{C}-NH-R'''-NH-\underset{\underset{S}{\|}}{C}-R$$
(d) 
$$\begin{array}{c} \overset{S}{\underset{\|}{C}}-NH \\ R''\diagup \quad \diagdown R'' \\ \diagdown NH-\underset{\underset{S}{\|}}{C}\diagup \end{array}$$

wherein R is a monovalent hydrocarbon radical of from 1 to 20 carbon atoms, R" is a divalent hydrocarbon radical of from 1 to 20 carbon atoms with both valences on the same carbon atom and R''' is a divalent hydrocarbon radical of from 2 to 20 carbon atoms with the valences on different carbon atoms.

References Cited in the file of this patent
UNITED STATES PATENTS
2,723,969    Naylor _____ Nov. 15, 1955

UNITED STATES PATENT OFFICE
CERTIFICATE OF CORRECTION

Patent No. 2,852,498

September 16, 1958

Harris Walton Bradley et al.

It is hereby certified that error appears in the printed specification of the above numbered patent requiring correction and that the said Letters Patent should read as corrected below.

Column 3, line 47, Table I, third column thereof, for "60/200" read -- 60/100 --; line 48, for "60/100" read -- 60/120 --; column 4, line 74, for "used addition" read -- used in addition --; column 5, line 35, for "$R''$" read -- $R'''$ --; line 39, for "0.2" read -- 0.5 --.

Signed and sealed this 17th day of February 1959.

(SEAL)
Attest:

KARL H. AXLINE
Attesting Officer

ROBERT C. WATSON
Commissioner of Patents